(12) United States Patent
Mittelstädt et al.

(10) Patent No.: US 10,152,810 B2
(45) Date of Patent: Dec. 11, 2018

(54) TECHNIQUES FOR DISPLAYING DATA COMPRISING TIME AND ANGULAR VALUES ACQUIRED FROM A TECHNICAL OR INDUSTRIAL PROCESS

(71) Applicant: SIEMENS AKTIENGESELLSCHAFT, München (DE)

(72) Inventors: Sebastian Mittelstädt, München-Haidhausen (DE); Jonas Mlynek, Berlin (DE); Stefan Hagen Weber, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 39 days.

(21) Appl. No.: 15/336,868

(22) Filed: Oct. 28, 2016

(65) Prior Publication Data
US 2018/0114347 A1    Apr. 26, 2018

(30) Foreign Application Priority Data

Oct. 21, 2016  (EP) .................................... 16195038

(51) Int. Cl.
| | |
|---|---|
| *G06T 11/20* | (2006.01) |
| *G06Q 10/06* | (2012.01) |
| *G06Q 50/04* | (2012.01) |
| *G06T 11/00* | (2006.01) |
| *G06F 17/30* | (2006.01) |

(52) U.S. Cl.
CPC ...... *G06T 11/206* (2013.01); *G06F 17/30572* (2013.01); *G06Q 10/06395* (2013.01); *G06Q 50/04* (2013.01); *G06T 11/001* (2013.01); *G06T 11/20* (2013.01)

(58) Field of Classification Search
None
See application file for complete search history.

(56) References Cited

U.S. PATENT DOCUMENTS

| | | | |
|---|---|---|---|
| 6,535,825 B1 * | 3/2003 | Okano | B30B 1/265 100/99 |
| 6,750,864 B1 * | 6/2004 | Anwar | G06F 17/30489 345/440 |
| 7,664,743 B2 * | 2/2010 | Okawa | G06F 17/30274 707/766 |
| 8,638,981 B2 | 1/2014 | Hao | |
| 9,613,447 B2 * | 4/2017 | Lentz | G06T 11/206 |

(Continued)

OTHER PUBLICATIONS

Daniel A. Keim; "Designing Pixel-Oriented Visualization Techniques: Theory and Applications;" IEEE Transactions on Visualization and Computer Graphics, vol. 6, No. 1, Jan.-Mar. 2000; pp. 59-78.*

(Continued)

*Primary Examiner* — Edward Martello
(74) *Attorney, Agent, or Firm* — Schmeiser, Olsen & Watts LLP

(57) ABSTRACT

A method executed by a computer is provided, including the steps of capturing a plurality of datasets, each dataset at least including a time value and an angular value, and placing pixels representing the datasets in a polar coordinate system at a radial distance from a center according to the time value and at an angle from a reference direction according to the angular value.

13 Claims, 9 Drawing Sheets

(56) References Cited

U.S. PATENT DOCUMENTS

| | | | |
|---|---|---|---|
| 2005/0078111 A1* | 4/2005 | Cardno | G06Q 30/02 345/440 |
| 2007/0006636 A1* | 1/2007 | King | G01H 1/003 73/1.84 |
| 2009/0046096 A1* | 2/2009 | Rampersad | G06F 19/3418 345/419 |
| 2010/0231594 A1 | 9/2010 | Hao | |
| 2010/0309207 A1 | 12/2010 | Prior | |
| 2011/0072893 A1* | 3/2011 | Malaczynski | F02D 41/1498 73/114.03 |
| 2013/0278623 A1 | 10/2013 | Hao | |

OTHER PUBLICATIONS

Weber et al. "Visualizing Time-Series on Spirals;" IEEE Symposium on Information Visualization 2001; Oct. 22-23, 2001; 6 pages; Paradise Point Hotel, San Diego, California.*

Carlis et al.; "Interactive Visualization of Serial Periodic Data;" Proceedings of the 11th annual ACM symposium on User interface software and technology; pp. 29-38; San Francisco, CA, USA—Nov. 1-4, 1998.*

Draper et al., "A Survey of Radial Methods for Information Visualization;" IEEE Transactions on Visualization and Computer Graphics, vol. 15, No. 5, Sep./Oct. 2009; pp. 759-776.*

* cited by examiner

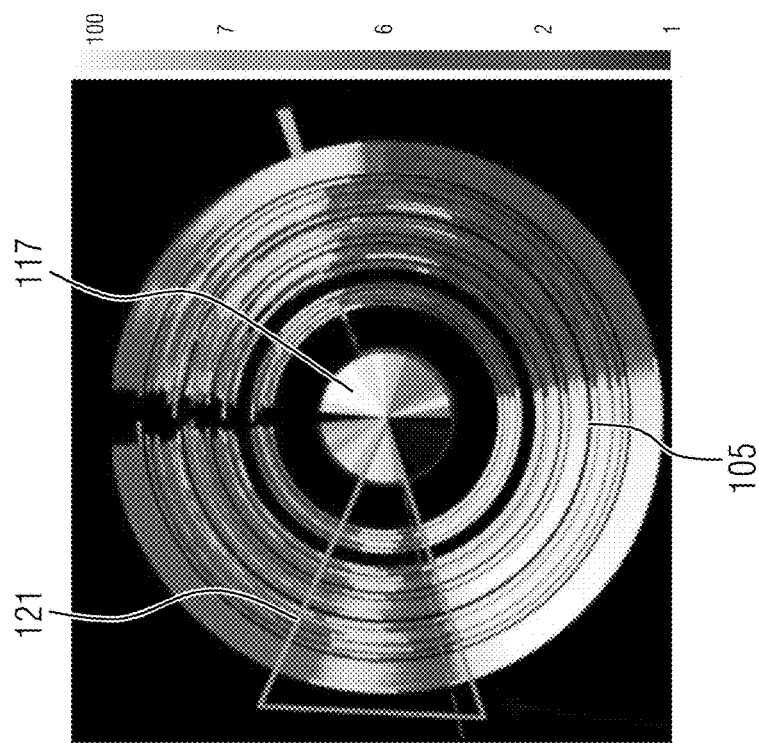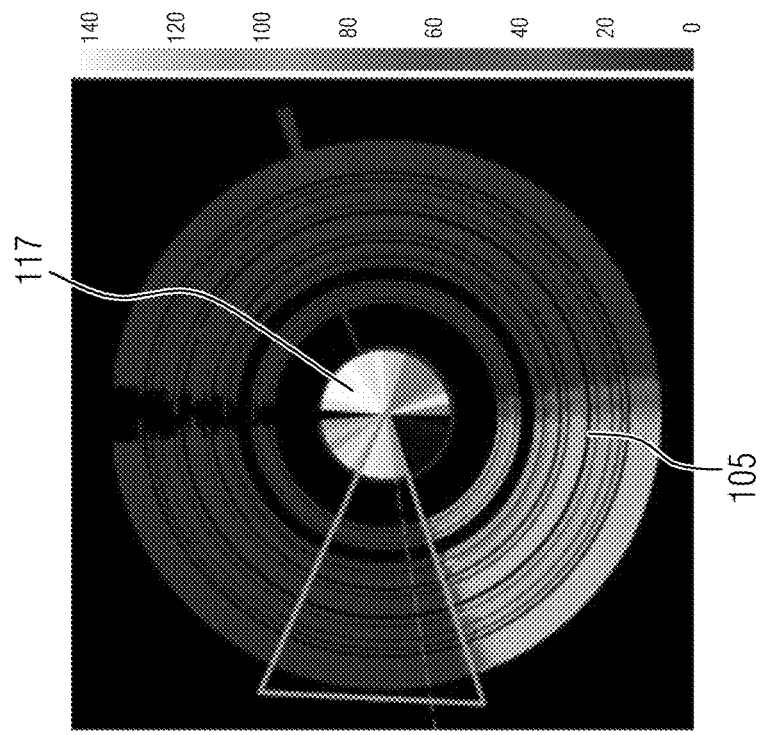
FIG 8

TECHNIQUES FOR DISPLAYING DATA COMPRISING TIME AND ANGULAR VALUES ACQUIRED FROM A TECHNICAL OR INDUSTRIAL PROCESS

CROSS-REFERENCE TO RELATED APPLICATIONS

This application claims priority European application No. 16195038.1 having a filing date of Oct. 21, 2016, the entire contents of which are hereby incorporated by reference.

FIELD OF TECHNOLOGY

The following relates to a method for placing pixels representing the datasets and a corresponding system.

BACKGROUND

Monitoring and analyzing production processes is an essential feature of industrial manufacturing. Measured values of this processes help in optimizing the industrial manufacturing. In this procedures data comprising a huge number of datasets is acquired. However, often it is necessary to reprocess these data for optical recognition of particular patterns by a human user. The human user should comprehend data quickly and intuitively for an individual assessment.

Document U.S. Pat. No. 8,638,981 B2 relates to placing temporally aligned and variably sized pixels in discrete rings in a graphical visualization.

Document US 2013/0278623 A1 relates to providing a correlation ring for indicating correlation between attributes.

SUMMARY

An aspect relates to concretely improving displaying data comprising time values and corresponding angular values acquired from a technical or industrial process.

According to a first aspect this object is concretely solved by a method executed by a computer, comprising the steps of capturing a plurality of datasets, each dataset at least comprising a time value and an angular value; and placing pixels representing the datasets in a polar coordinate system at a radial distance from a center according to the time value and at an angle from a reference direction according to the angular value. The method allows a quick and intuitive human capturing of data and an assessment of the underlying process. Critical or abnormal states in each cycle can be identified easily.

In a technically preferred embodiment of the method each pixel is colored on the basis of a measured value additionally comprised in the dataset. This embodiment has the technical advantage that the cycle of the underlying process can be captured and with respect to other cycles.

In a further technically preferred embodiment of the method the color of each pixel is selected on the basis of a certain scale or normalization such as a linear scale, a logarithmic scale or a percentile scale with respect to the measured value. This embodiment has the technical advantage that particular intervals of measured values are color coded.

In a further technically preferred embodiment of the method a predefined color is assigned to each pixel, when the measured value of the corresponding dataset exceeds a predefined threshold. This embodiment has the technical advantage that particular datasets can be highlighted.

In a further technically preferred embodiment of the method a color assigned to each pixel can be modified according to a color scheme. This embodiment has the technical advantage that highlighting of measured values can be adapted.

In a further technically preferred embodiment of the method the color scheme can be adapted to the measured data such as a linear color scheme or a percentile color scheme. This embodiment has the technical advantage that suitable color schemes are used.

In a further technically preferred embodiment of the method the measured value is a pressure value of a press. This embodiment has the technical advantage that the state of a press can be displayed and captured over time easily and with respect to each cycle and angle.

In a further technically preferred embodiment of the method pixels representing a variance of a plurality of measured values of datasets having same angular value are placed in the polar coordinate system. This embodiment has the technical advantage that relevant areas having low or high entropy can be identified.

In a further technically preferred embodiment of the method the color of each pixel representing the variance is selected on the basis of a linear scale, a logarithmic scale or a percentile scale with respect to the variance. This embodiment has the technical advantage that relevant areas can be captured more easily.

In a further technically preferred embodiment of the method the pixels representing the variance are located on a circle with respect to the center. This embodiment has the technical advantage that the variance with respect to each angular value can be shown.

In a further technically preferred embodiment of the method the plurality of datasets is captured by a sensor. This embodiment has the technical advantage that dataset stream can be provided directly or in real-time.

In a further technically preferred embodiment of the method the plurality of datasets is captured on a rotating machine or oscillating machine. This embodiment has the technical advantage that states of the rotating machine or oscillating machine can be identified easily.

According to a second aspect this object is concretely solved by a method for displaying an image on the basis of a data stream, the data stream comprising at least a plurality of time values and a plurality of corresponding angular values, comprising the steps of splitting the data stream into a first subset data stream comprising time values and a second data stream comprising angular values, and displaying the data stream by placing pixels in a polar coordinate system at a radial distance from a center according to the first data stream and at an angle from a reference direction according to the second data stream. This method has the same technical advantages as the method according to the first aspect.

In a further technically preferred embodiment of the method comprises the step of capturing the data stream by means of a sensor. This embodiment has the technical advantage that the data stream can be provided directly or in-real time.

According to a third aspect this object is concretely solved by a system for displaying an image on the basis of a data stream, the data stream comprising at least a plurality of time values and a plurality of corresponding angular values, comprising a splitter for splitting the data stream into a first subset data stream comprising time values and a second data stream comprising angular values, and a controller for displaying the data stream by placing pixels in a polar coordinate system at a radial distance from a center according to the first data stream and at an angle from a reference direction according to the second data stream. This system has the same technical advantages as the method according to the first aspect.

BRIEF DESCRIPTION

Some of the embodiments will be described in detail, with reference to the following figures, wherein like designations denote like members, wherein:

FIG. 8 shows a further time-angle spiral graph including augmenting data; and

DETAILED DESCRIPTION

Figure 1:
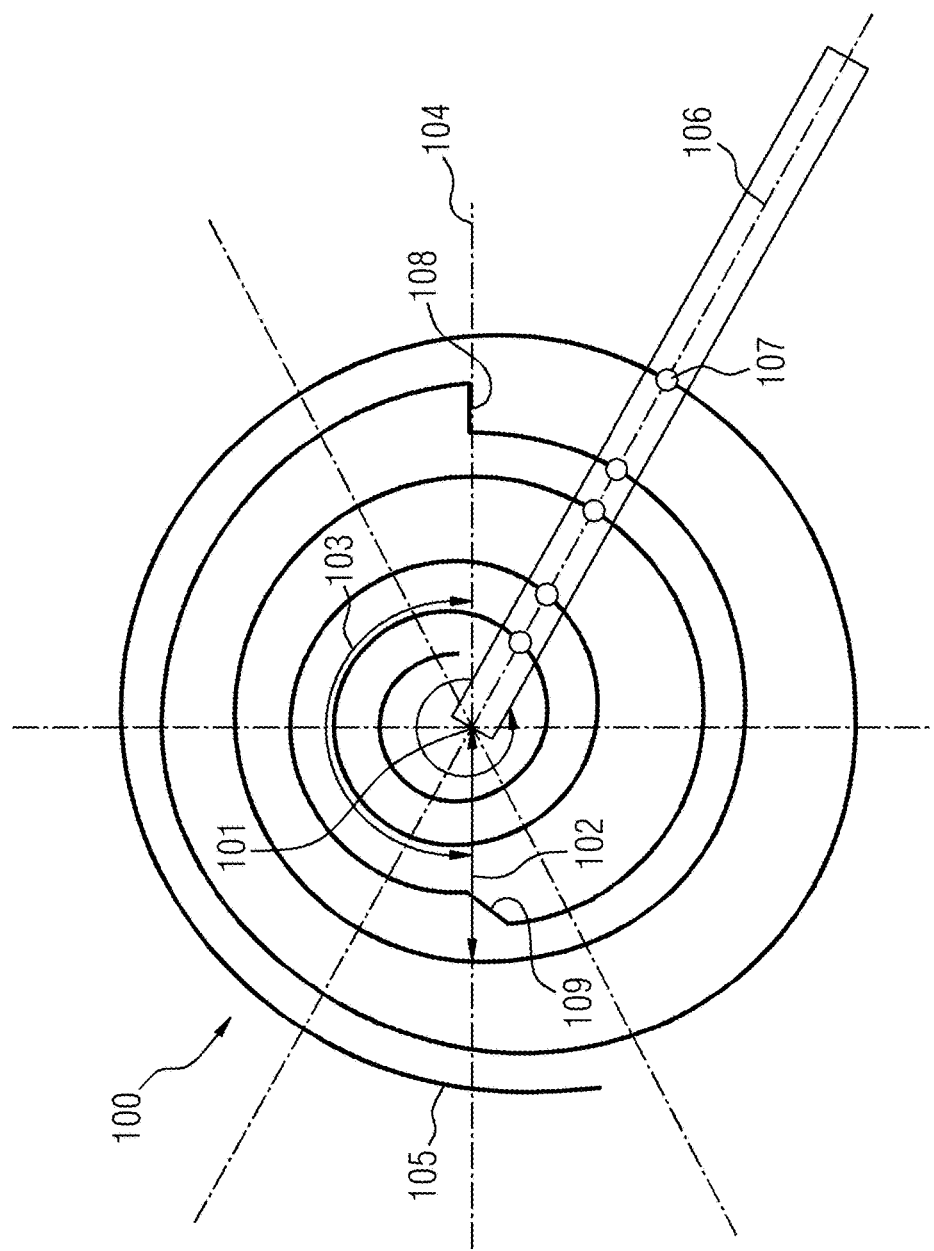
FIG. 1 shows a schematic view of placing pixels representing the datasets.

FIG. 1 shows a schematic view of placing pixels representing the datasets. The view is obtained with a method executed by a computer, comprising the steps capturing a plurality of datasets 107, each datasets 107 at least comprising a time value and an angular value; and placing pixels representing the datasets 107 in a polar coordinate system 100 at a radial distance 102 from a center position 101 according to the time value and at an angle 103 from a reference direction 104 according to the angular value. A time-angle spiral graph 105 results from the successive datasets 107 running in counterclockwise direction.

Each pixel represents a dataset. The pixels are positioned on a spiral. Datasets 107 having older time values are located more inwardly than datasets 107 having younger time values. Time values can be represented by real numbers and can be acquired regularly or irregularly.

The time value corresponds to the distance between the center and the position of the pixel representing the dataset. The angular value corresponds to the angle between a reference direction 104 and the position of the pixel representing the dataset.

Measure values, like values of sensors, are represented by colored pixels. Measure values can be real numbers. Color can be selected from a corresponding color space, such as a linear or logarithmic color space or a color space based on a percentile distribution.

Each pixel is positioned in a way that all datasets 107 having the same angular value within a cycle are located on a line 106 originating from the center 101 of the spiral 105. In this way various cycles of a press can be depicted. Datasets obtained at identical angular positions of the press but in different cycles are located on the line 106.

Feature 108 shows a standstill in which no angular movement occurs during a particular time period. Feature 109 shows a slower angular movement as compared with the remaining spiral 105. In addition, the angular or temporal position of maximum measured values can be identified.

All characteristic data are presented in a way that a user is supported efficiently in assessing the data. Data patterns, e.g. at certain angles or in certain phases, can be identified easily. Trends or modification of measured values can be identified easily in dependence on time and angle.

The method can be applied in presses for depicting hydraulic pressure in dependence on crank angle and time. The method can be used in turbines or rotors for depicting vibrations in dependence on rotational angle and time or in drive trains for depicting temperatures, vibrations, noise in dependence on rotational angle and time. The method can be applied in short or even long time intervals.

Figure 2:
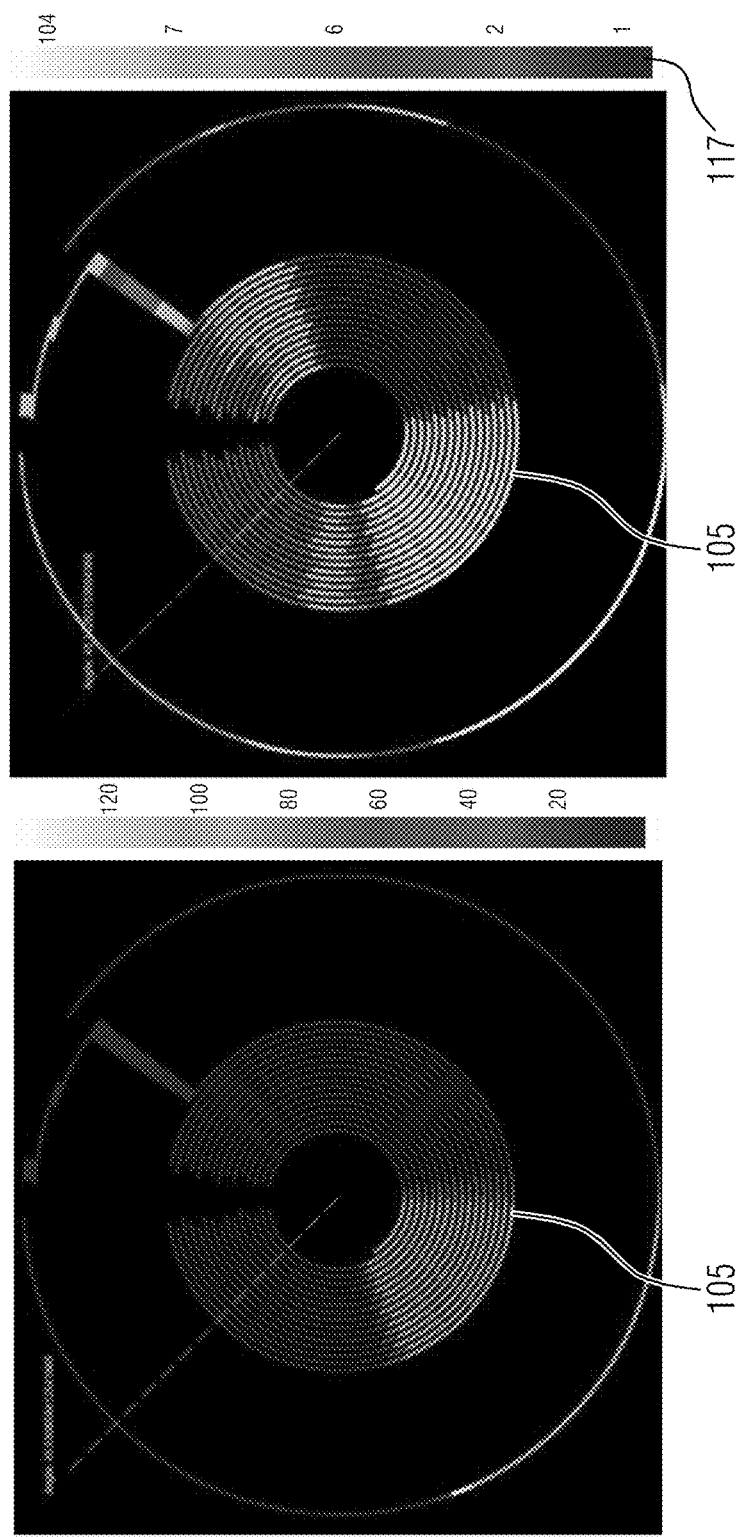
FIG. 2 shows a time-angle spiral graph.

FIG. 2 shows a time-angle spiral graph 105 based on a basic implementation for depicting the pressure of a press in a number of successive cycles. The time-angle spiral graph is based on 5.000 datasets. Measured values are coded by colors based on a linear distribution (left) or on a percentile distribution (right). By clicking on the right color scale 117 color distributions can be changed.

Figure 3:
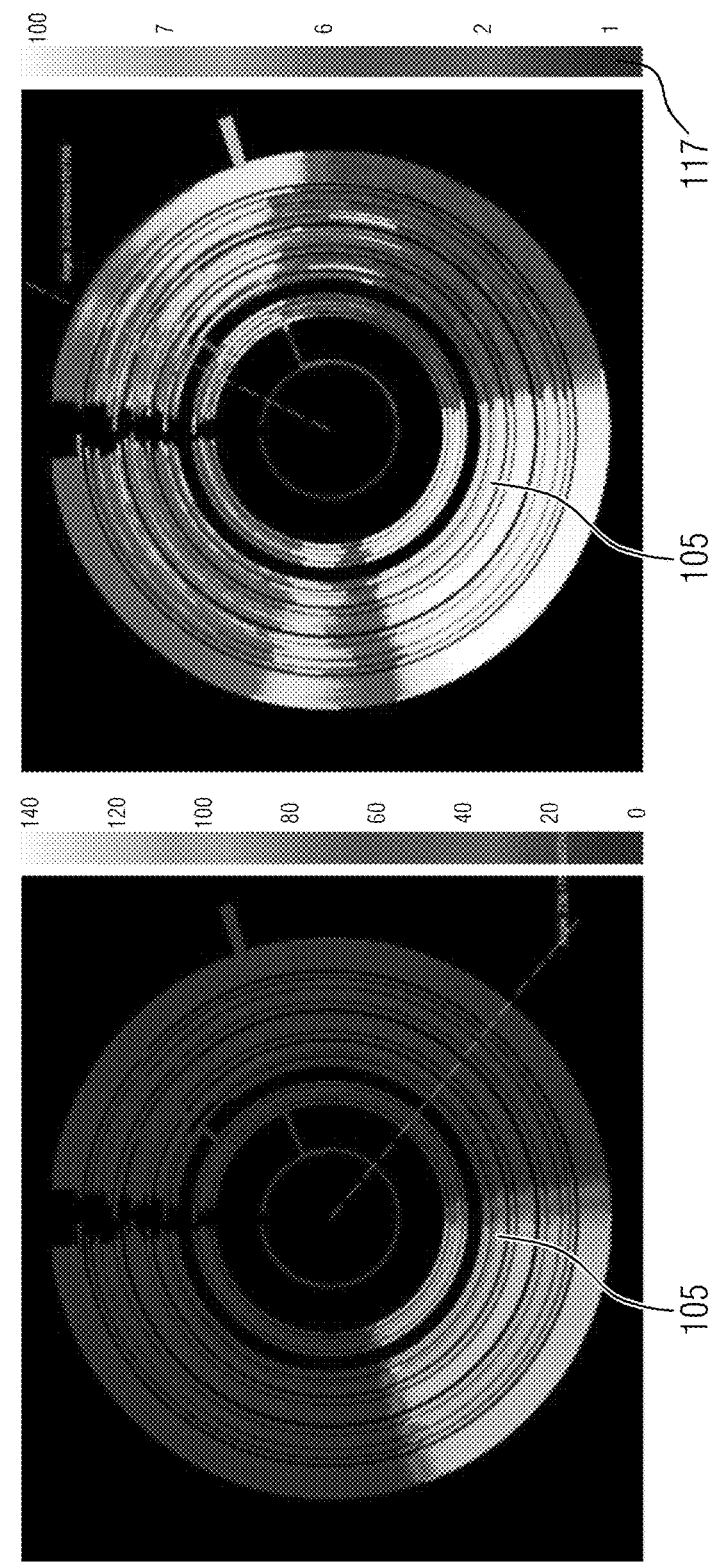
FIG. 3 shows a further time-angle spiral graph.

FIG. 3 shows a further time-angle spiral graph 105 based on a basic implementation for depicting the pressure of a press in a number of successive cycles. The time-angle spiral graph is based on 50.000 datasets. The values of measured values are coded by colors based on a linear distribution (left) or on a percentile distribution (right).

Figure 4:
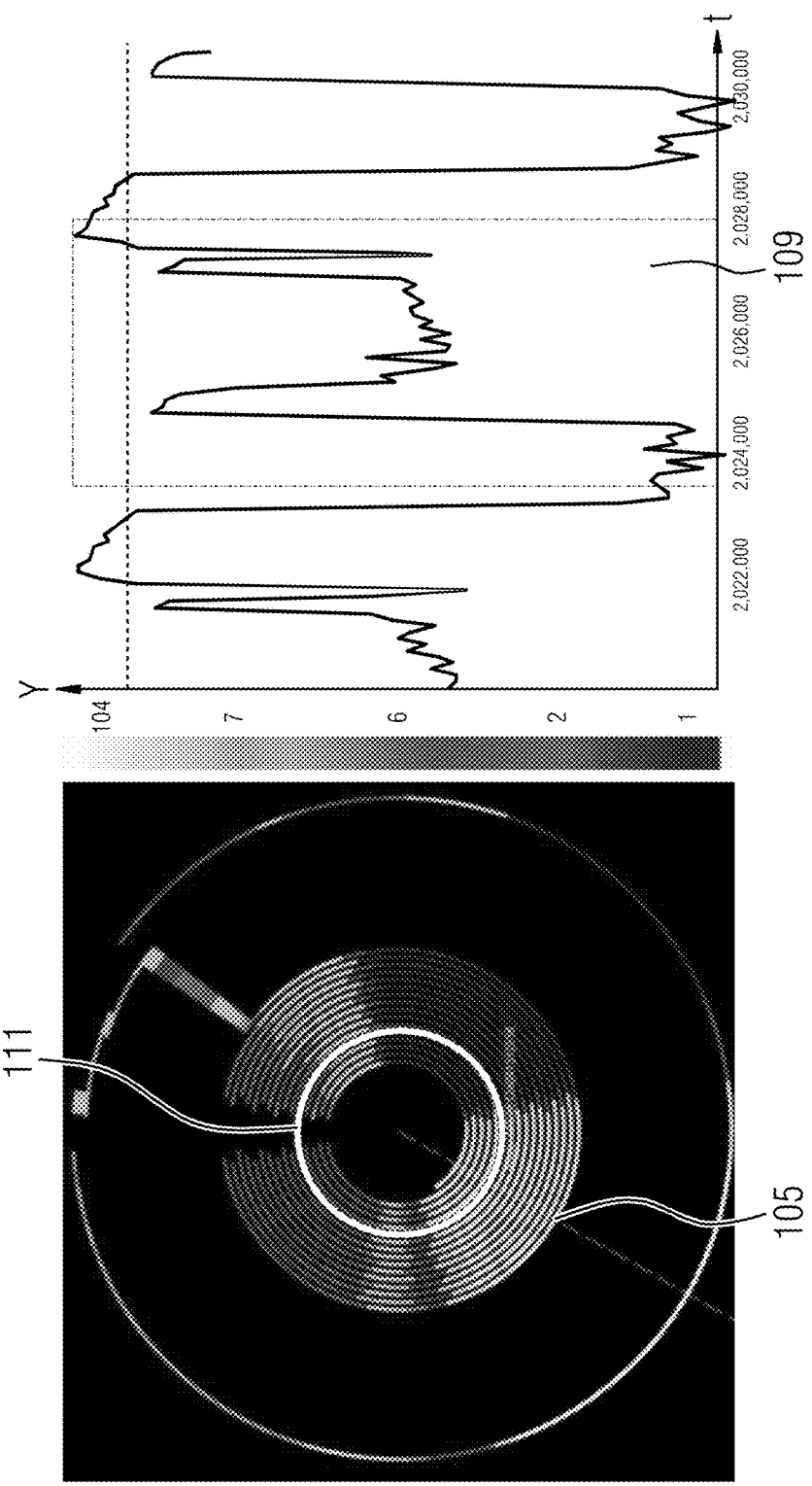
FIG. 4 shows a time-angle spiral graph interaction.

FIG. 4 shows a time-angle spiral graph interaction. The right diagram shows a course of a measured value Y in dependence on time t. The right diagram is for example a linear chart depicting the measured value of a pressure over time t. If a particular temporal interval 109 is selected or marked from the right diagram, the corresponding interval is shown and highlighted in the left time-angle spiral graph 105 as a ring 111.

If on the contrary a particular temporal interval 111 is selected or marked from the time-angle spiral graph 105, the corresponding interval is shown and highlighted in the right diagram.

Figure 5:
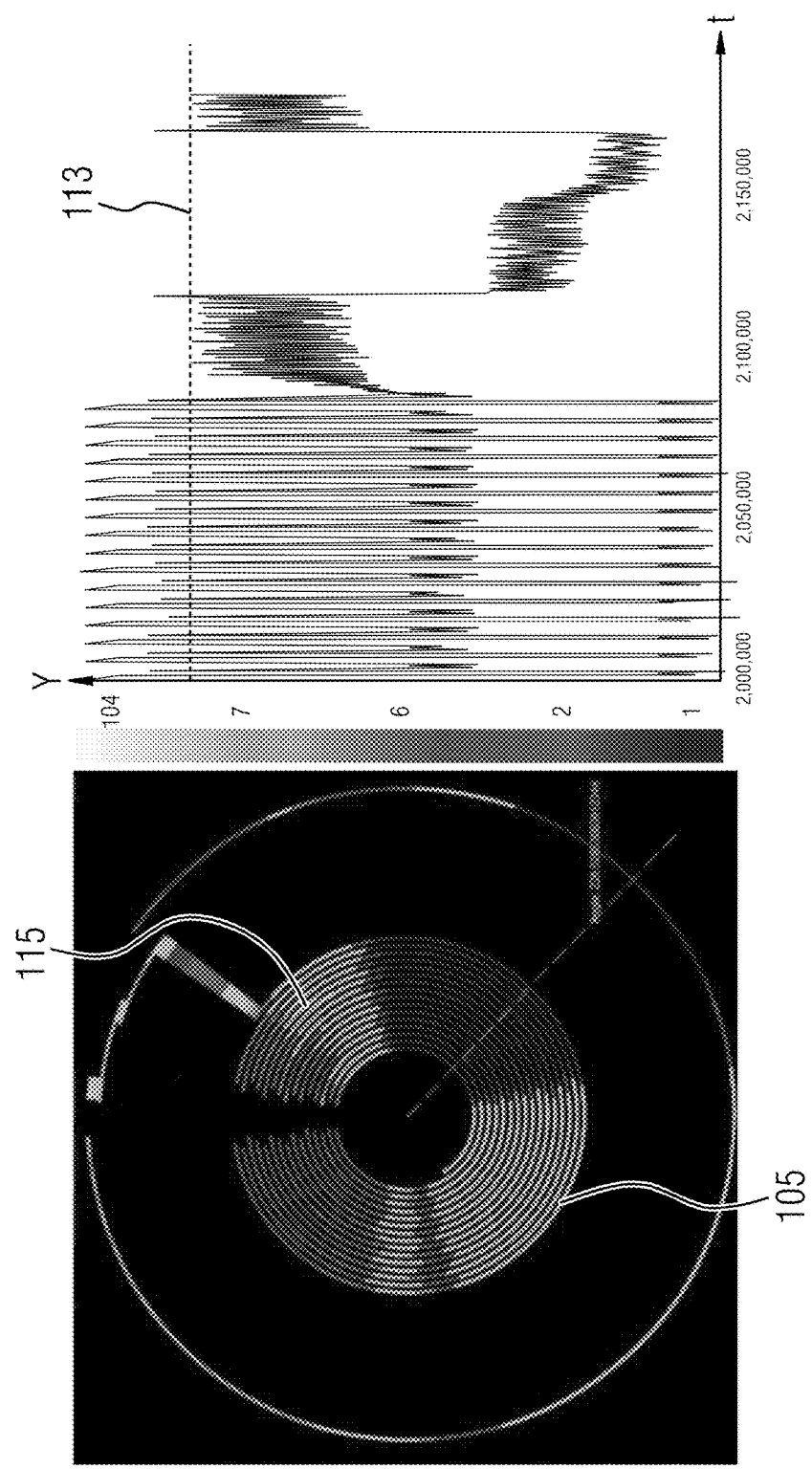
FIG. 5 shows a further time-angle spiral graph interaction.

FIG. 5 shows a further time-angle spiral graph interaction. The right diagram also shows a course of a measured value Y in dependence on time t. By defining a threshold 113 and shifting the threshold 113 with respect to the measured values, pixels 115 of the datasets 107 can be colored or highlighted that exceed the predefined threshold 113. In this way a dynamical coloring of datasets 107 comprising measured values exceeding the threshold 113 is achieved and maximum values can be identified.

Figure 6:
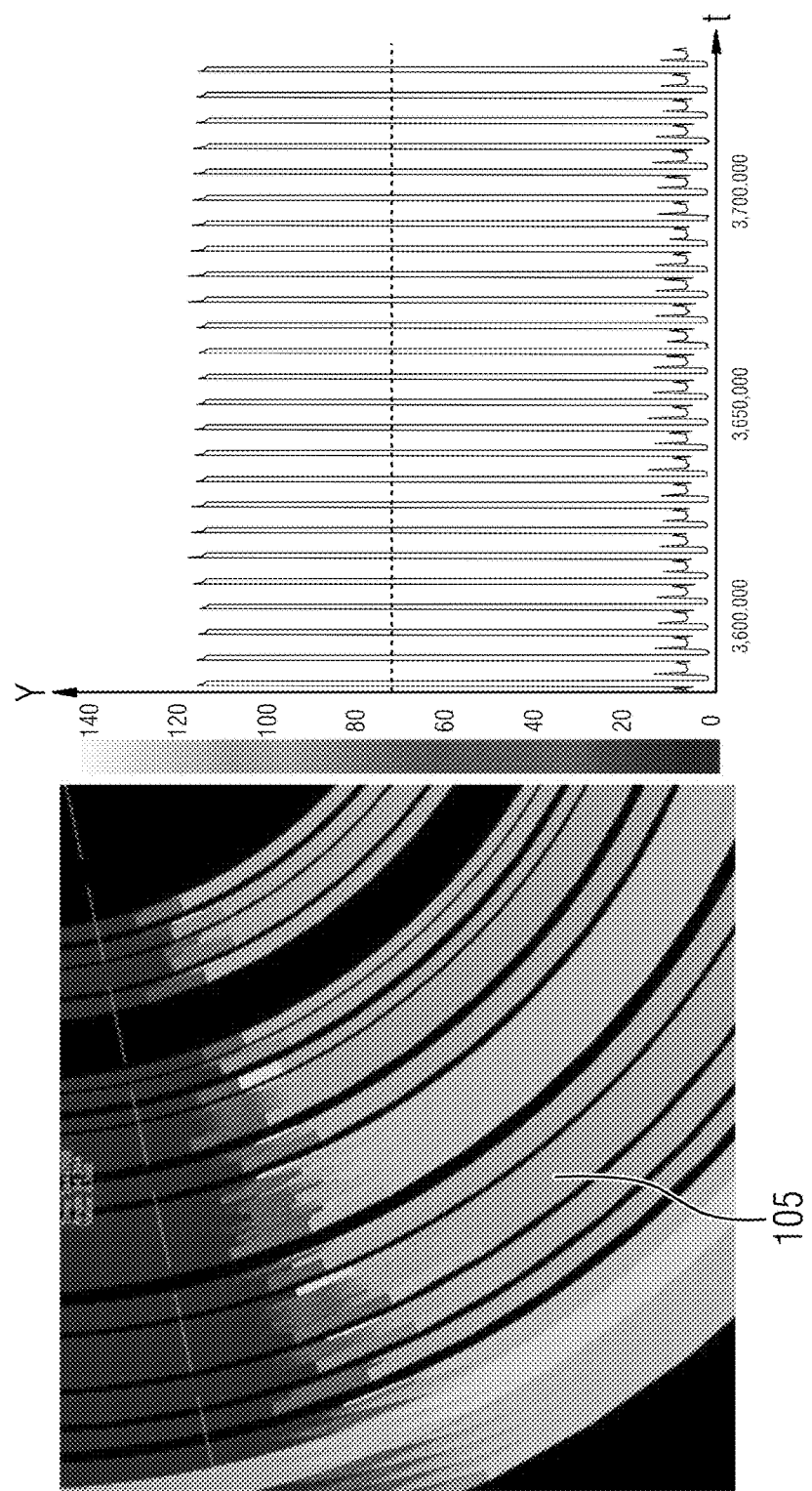
FIG. 6 shows a further time-angle spiral graph interaction.

FIG. 6 shows a further time-angle spiral graph interaction in a zoom view. By rotation a mouse wheel a dynamic zooming-in or zooming-out at the position of a mouse pointer is realized. Selected areas can be enlarged or minimized arbitrarily. Patterns can be more easily identified by enlarging areas.

In this case angle and pressure form a saw tooth profile over time. By interactive zooming-in the user is able to identify even slight irregular patterns or modifications of measured values. By selecting time areas corresponding intervals can be highlighted or filtered. These can be additionally visualized in line plots or line diagrams.

Figure 7:
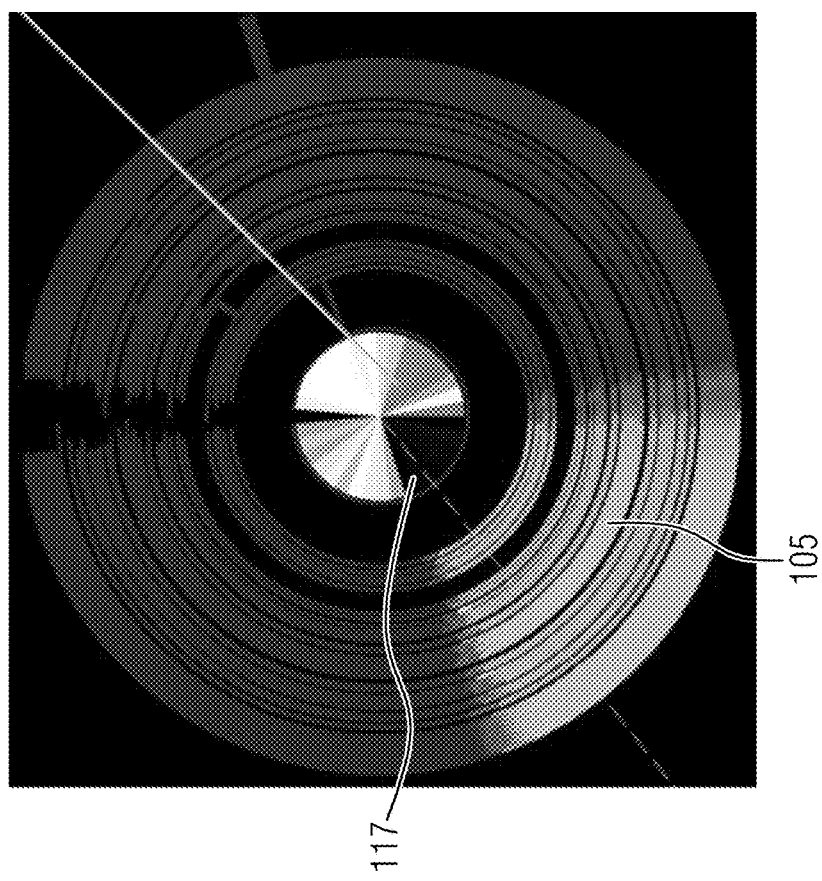
FIG. 7 shows a time-angle spiral graph including augmenting data.

FIG. 7 shows a time-angle spiral graph 105 including augmenting angle dependent data or metrics. The middle of the spiral 105 is used for displaying further angle-dependent information. The inner circle 117 shows entropy or variance of measured data within the corresponding radial segment and the particular angle of the spiral 105. Brighter pixels correspond to higher values.

Also in this case a dynamical coloring of pixels can be used to represent angle-dependent information. High entropy, i.e. bright pixels, may correspond to varying measured pressure values at same angles within different cycles.

FIG. 8 shows a further time-angle spiral graph 105 including augmenting data. Measured values are coded by colors based on a linear distribution (left) or on a percentile distribution (right). Also in this case the inner circle 117 shows entropy or variance of measured data within the corresponding radial segment or particular angle of the spiral 105. The measured value of technical features is calculated and analyzed with respect to the angle. This illustrates modifications of measured values with respect to the cycles.

In presses for manufacturing parts it is assumed that the same pressure is existent in same angle of different cycles, since the mechanical parts of the press are in equal condition. However, color-coded variance or entropy pixels in the middle of the spiral 105 illustrate different pressures at same values. In this way unexpected behavior or faults of the press can be visualized. Here can be recognized that pressure drops before the main pressing procedure in area 121.

Figure 9:
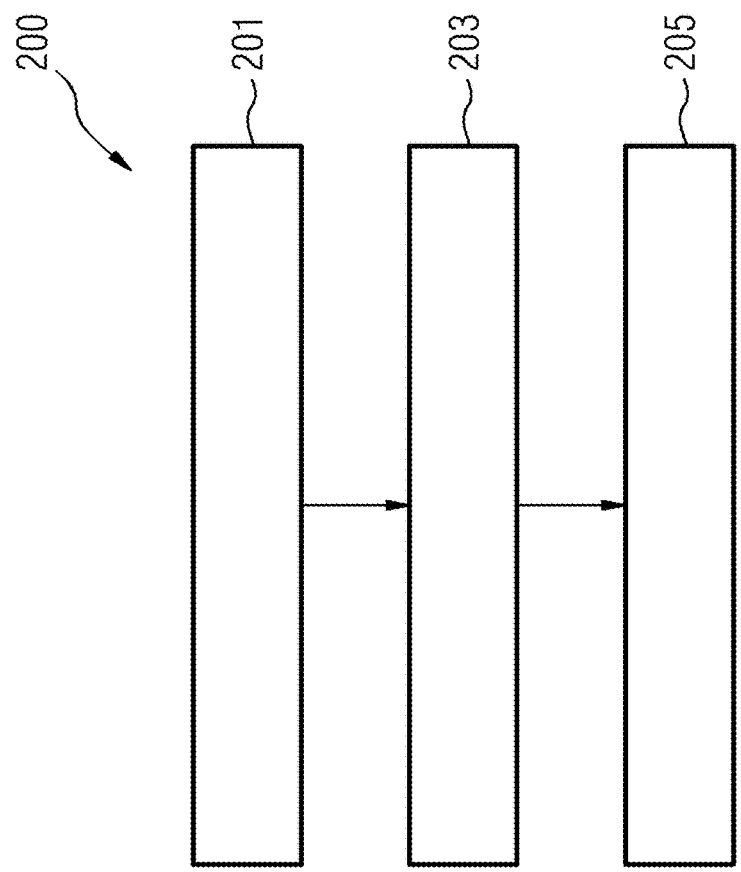
FIG. 9 shows a schematic view of a system.

FIG. 9 shows a schematic view of a system 200 for displaying an image on the basis of a data stream on a screen 201. The data stream comprises at least a plurality of time values and a plurality of corresponding angular values.

The system comprises a digital splitter 203 for splitting the data stream into a subset data stream comprising time values and a data stream comprising angular values. In addition, the system comprises a controller 205 for displaying the data stream by placing pixels in a polar coordinate system at a radial distance from a center according to the first data stream and at an angle from a reference direction according to the second data stream on the screen 205.

The splitter 203 and the controller 205 can be implemented as hard-wired electronic circuits or by a computer program running on a computer. The computer comprises a memory for storing digital data and a processor for processing data from the memory.

The method visualizes a relationship of cycle and time information of a rotating element by using different color schemes for measured values. In this way a general view on technical features in dependence on time and angle is obtained. The method calculates metrics concerning a plurality of cycles in dependence on angle, time and measured values.

By visualizing cycle and time information a pattern recognition of cyclic processes over time and a recognition of trends with respect to particular angles or cycle intervals is facilitated. Additional data, like variance or entropy, can be represented or visualized in the inner part of the spiral 105. In this way datasets 107 having time, angle and sensor information can be augmented with additional data so that an easy human understanding in an abstract view is achieved.

The method allows for detecting and identifying faults, measured values exceeding limits, unknown or faulty behavior or wearing of machines, since the method depicts the measured values with respect to time and cycle. Thus, production methods can be analyzed and optimized in an easy way. Searching for faulty behavior of machines is facilitated.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A method executed by a computer, comprising the steps:
   capturing, by a sensor, a plurality of datasets related to a machine, each dataset of the plurality of datasets at least comprising a time value of a cycle carried out by the machine and an angular value of a component of the machine; and
   placing a plurality of pixels representing the plurality of datasets in a polar coordinate system at a radial distance from a center according to the time value and at an angle from a reference direction according to the angular value.

2. The method according to claim 1, wherein each pixel of the plurality of pixels is colored on a basis of a measured value additionally comprised in the dataset.

3. The method according to claim 2, wherein a color of each pixel of the plurality of pixels is selected on a basis of a certain scale or normalization, the certain scale or normalization being a linear scale, a logarithmic scale or a percentile scale with respect to the measured value.

4. The method according to claim 2, wherein a predefined color is assigned to each pixel of the plurality of pixels, when the measured value of the corresponding dataset exceeds a predefined threshold.

5. The method according to claim 2, wherein a color assigned to each pixel of the plurality of pixels is modified according to a color scheme.

6. The method according to claim 5, wherein the color scheme is configured to the measured data, as a linear color scheme or a percentile color scheme.

7. The method according to claim 2, wherein the machine is a press and the measured value is a pressure value of the press.

8. The method according to claim 2, wherein pixels representing a variance of a plurality of measured values of datasets having a same angular value are placed in the polar coordinate system.

9. The method according to claim 8, wherein the color of each pixel representing the variance is selected on a basis of a linear scale, a logarithmic scale or a percentile scale with respect to the variance.

10. The method according to claim 9, wherein the pixels representing the variance are located on a circle with respect to the center.

11. The method according to claim 1, wherein the plurality of datasets is captured on a rotating machine or oscillating machine.

12. A method for displaying an image on a basis of a data stream, the data stream comprising at least a plurality of time values of an industrial process carried out by a machine and a plurality of corresponding angular values of a component of the machine carrying out the industrial process, wherein the time values and angular values are captured by a sensor, comprising the steps:
   splitting the data stream into a first subset data stream comprising time values and a second data stream comprising angular values; and
   displaying the data stream by placing pixels in a polar coordinate system at a radial distance from a center according to the first data stream and at an angle from a reference direction according to the second data stream.

13. A system for displaying an image on a basis of a data stream, the data stream comprising at least a plurality of time values captured by a sensor and a plurality of corresponding angular values captured by a sensor, comprising:
 a splitter for splitting the data stream into a first subset data stream comprising time values and a second data stream comprising angular values; and
 a controller for displaying the data stream by placing pixels in a polar coordinate system at a radial distance from a center according to the first data stream and at an angle from a reference direction according to the second data stream;
 wherein the time values relate to a pressing cycle of a press for applying hydraulic pressure, and wherein the angular values are crank angles of the press.

\* \* \* \* \*